M. SIEVEKING.
MOBILE FIGURE.
APPLICATION FILED JAN. 27, 1919.

1,322,364.

Patented Nov. 18, 1919.

WITNESSES

INVENTOR
Martinus Sieveking
BY
ATTORNEYS

UNITED STATES PATENT OFFICE.

MARTINUS SIEVEKING, OF NEW YORK, N. Y.

MOBILE FIGURE.

1,322,364. Specification of Letters Patent. Patented Nov. 18, 1919.

Application filed January 27, 1919. Serial No. 273,394.

*To all whom it may concern:*

Be it known that I, MARTINUS SIEVEKING, a citizen of Holland, and a resident of the city of New York, borough of Manhattan, in the county and State of New York, have invented a new and Improved Mobile Figure, of which the following is a description.

My invention relates to figures constituting for example a cap ornament for automobile radiators or for a flag pole or arranged to be mounted in other situations and to be mobile or have mobile elements adapted to be vibrated by jarring or by wind pressure, so that the movements may for example be made to simulate those of a bird or its wings.

The general object of my invention is to provide a figure of the indicated character so arranged with respect to the mobile elements and the controlling means therefor as to result in a movement of parts which in the case of a bird, for instance, will more closely approach the natural movements of the wings and whereby in any event the mobile parts will be so sensitive and unstable as to readily respond to slight force tending to vibrate the same while at the same time the structure will possess durability.

Reference is to be had to the accompanying drawings forming a part of this specification, it being understood that the drawings are merely illustrative of one example of the invention.

Figure 1:
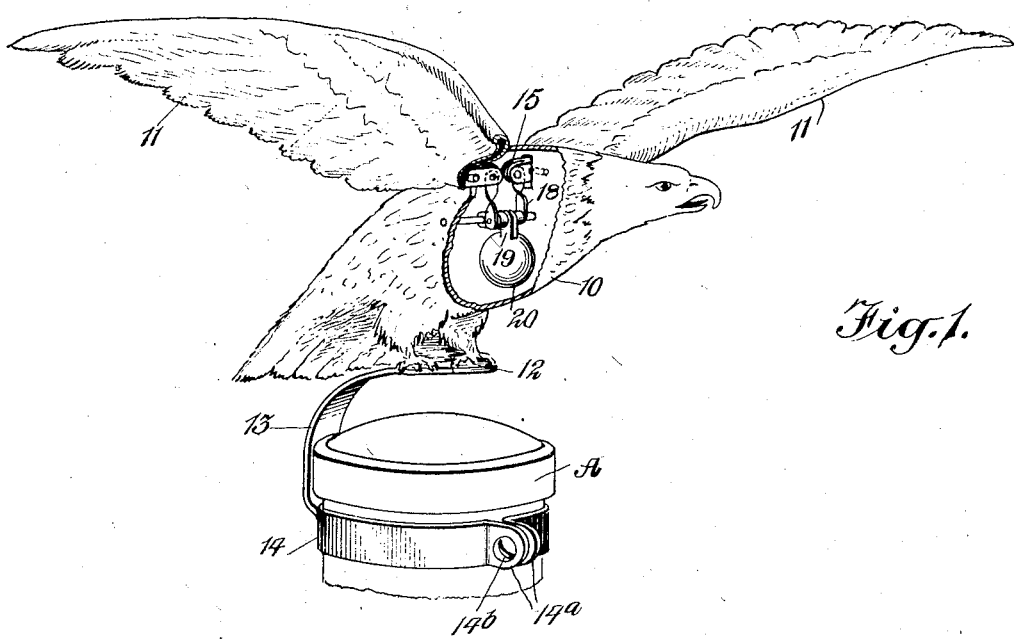
Figure 1 is a perspective view of a mobile figure embodying my invention.
Figure 2:
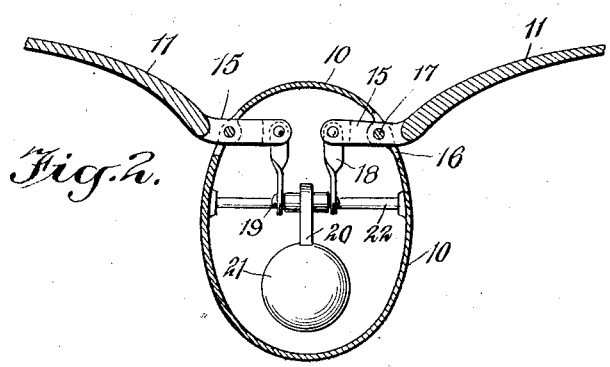
Fig. 2 is an enlarged fragmentary cross section as indicated by the line 2—2, Fig. 3.
Figure 3:
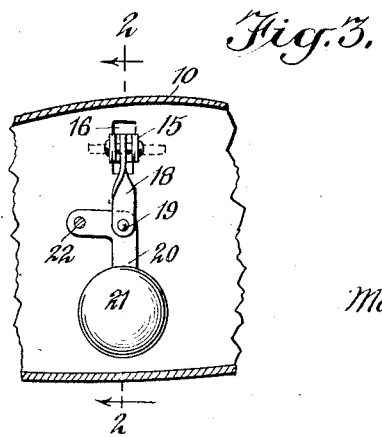
Fig. 3 is a fragmentary longitudinal vertical section.

I have shown my invention as embodied in the figure of a bird but it will be understood that it may represent other things than a bird and in the illustration the device is shown as applied to the cap of a radiator shown in part.

In carrying out my invention the body 10 is hollow and has pivotally mounted plane elements 11 simulating wings. The body is mounted on a base 12 on a spring or resilient support 13 which is provided with a clamp 14 in the form of a split band or flat ring adapted to be secured about the cap A of a radiator or to the top of a flag pole or like support. Said band may, as shown, have parallel ears 14$^a$ at the ends and a clamp screw 14$^b$ therein. The arrangement is such that with the vibrations incident to the traveling of the automobile, the device will be jarred to vibrate the device as a whole or the wings thereof and said wings are adapted also to wind pressure to cause them to flap or beat in a manner simulating natural wings. Regardless of the force of the wind or the shock produced by jarring, the wings or like parts are controlled by my improved controlling means as next described.

The wings are formed with rigid arms 15 at their inner ends which in the illustrated example extend through lateral openings 16 in the body 10 and are pivoted to the body as at 17 that the wings may flap or vibrate vertically. The inner ends of the arms 15 are connected by links 18 with a pendulous bellcrank 20, the connection of the links being at the angle of the bellcrank by a pin 19 or the like. Said bellcrank thus presents a depending arm, on which is a weight 21, and the other horizontal arm of the bellcrank is pivotally secured to the body of the structure as by a shaft or transverse pin 22.

With the described construction, wind pressure or jars causing the wings to move on their pivots will tend to move the pendulous bell crank 20 about its center of movement 22 and the weight will react and tend to restore the wings to their first position. It is extremely difficult to impart a natural movement to the wings as ordinary controlling means will prove inadequate. A spring, for example, if exceedingly sensitive will not have the strength to resist the pressures and shocks to which the device will be subjected and on the other hand if the spring be sufficiently strong to withstand shocks and reasonable high pressures, then it will not be sufficiently sensitive to make the wings or other mobile parts so unstable as to quickly respond to a displacing force and thereby maintain the necessary degree of activity of the parts. By the pendulous bell crank connected at its angle with the wings or like moving parts, the wings may readily respond to jars or to wind pressure, since comparatively little force is required to overcome the inertia of the pendulum. On the other hand, an increasing displacing movement is progressively resisted so that while I provide that unstable equilibrium much to be desired, I at the same time provide the resistance of material increase in the displacing force to thus effectively control the movements. The result is that a rather natural movement is imparted to the wings of a bird for example, the amplitude of their movements varying infinitely. Thus, the attractiveness of the figure is enhanced, since a construction that would result in an approximate uniformity of its movements will soon lose its attractiveness.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A device of the class described including a figure, an element thereon pivotally mounted to be vibratable, and presenting an area to be subject to wind pressure, and a pendulous controlling device linked to said element to be subject to vibrations thereof and yieldingly opposing movement of said element by wind pressure.

2. A device of the class described including a figure, a movable element pivoted to be vibratable, and a pendulous bell crank pivotally mounted by one arm and linked at its angle to said element.

3. In a device of the class described, a figure, wings thereon subject to wind pressure and pivotally mounted to vibrate under pressure a pendulous bell crank, one arm of which is pivotally mounted, and means connecting said bell crank adjacent to its angle with said wings so that vibration of the wings will tend to swing the pendulous bell crank and the latter will tend to restore the wings.

4. A device of the class described including a figure, movable elements thereon adapted to vibrate, means yieldingly opposing the vibration of said elements, a spring on which said figure is mounted, and means to fasten said spring on a support so that the jarring of the support will give bodily movement to the figure and thereby vibrate the wings and whereby the latter may respond to wind pressure subject to the controlling means.

MARTINUS SIEVEKING.